United States Patent
Ootera et al.

(10) Patent No.: US 6,800,224 B2
(45) Date of Patent: Oct. 5, 2004

(54) PRODUCTION PROCESS OF OPTICAL DISC AND OPTICAL DISC PRODUCED THEREBY

(75) Inventors: Yasuaki Ootera, Kawasaki (JP); Naomasa Nakamura, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 09/953,435

(22) Filed: Sep. 17, 2001

(65) Prior Publication Data

US 2003/0039794 A1 Feb. 27, 2003

(30) Foreign Application Priority Data

Aug. 24, 2001 (JP) .................................. 2001-254667

(51) Int. Cl.$^7$ ............................................ B29D 11/00
(52) U.S. Cl. ........................ 264/1.33; 264/1.36; 264/2.5
(58) Field of Search .............................. 264/1.33, 1.36, 264/1–7, 2.5; 425/810; 427/162

(56) References Cited

U.S. PATENT DOCUMENTS 5,171,392 A * 12/1992 Iida et al.
5,876,823 A * 3/1999 Nagashima

FOREIGN PATENT DOCUMENTS

| JP | 4-372741 | 12/1992 |
| JP | 6-119661 | 4/1994 |
| JP | 9-306026 | 11/1997 |
| JP | 10-222870 | 8/1998 |
| JP | 11-224439 | 8/1998 |
| JP | 10-283682 | 10/1998 |
| JP | 11-58401 | 3/1999 |

* cited by examiner

*Primary Examiner*—Mathieu D. Vargot
(74) *Attorney, Agent, or Firm*—Pillsbury Winthrop LLP

(57) ABSTRACT

A production process of an optical disk, wherein when a layer of an ultra violet rays curing resin which constitutes a portion of the optical disk is formed, a comi-transparent film of a metal is formed an a molded substrate on which a pattern was transcribed and this molded substrate is used as a semi-transparent stamper, and the production of an optical disk with two layers at one side is made easy thereby.

9 Claims, 2 Drawing Sheets

PRODUCTION PROCESS OF OPTICAL DISC AND OPTICAL DISC PRODUCED THEREBY

CROSS-REFERENCE TO RELATED APPLICATIONS

This application is based upon and claims the benefit of priority from the prior Japanese Patent Application No. 2001-254667, filed Aug. 24, 2001, the entire contents of which are incorporated herein by reference.

BACKGROUND OF THE INVENTION

1. Field of the Invention

The present invention relates to a production process of an optical disk with two layers on one side using an ultraviolet curing resin (2P resin: Photo-Polymer) and an optical disk produced thereby.

2. Description of the Related Art

Various methods have been employed to make a high capacity optical disk. One method is for making a disk on which one side was doubly layered, as shown in Japanese Patent Application Laid-Open No. 10-283682. A process for producing the optical disk using an ultraviolet curing resin (hereinafter, described as 2P resin) which is cured with ultraviolet rays, is adopted as the present production process of an optical disk with two layers on one side.

The production process is explained below. Firstly, a semi-transparent film is formed on a molded substrate on which a pattern for the first layer was transcribed. A 2P resin is coated on the first layer, a nickel stamper is pushed on the 2P resin, ultraviolet rays are irradiated to cure the 2P resin, and then the second layer is transcribed.

The prior art is characterized in that in order to avoid peeling the 2P resin from the first layer when peeling the stamper from the 2P resin, an adhesive layer is provided between the 2P resin and the first layer.

It is assumed that the prior art first generation DVD (Digital Versatile Disk) is subject to the incidence of laser light from a molded substrate side. The prior art DVD adopts a process in which the first layer on the molded substrate is semi-transparent and the 2P resin is sandwiched by a nickel stamper, and ultraviolet rays are irradiated to cure it.

However, the side which receives the incidence of laser light is opposite the side of the molded substrate in the next generation DVD, therefore it is the opposite side of the first generation DVD. Accordingly, the total reflection film of the second layer is formed on the molded substrate, and if the 2P resin is sandwiched by the nickel stamper, the 2P resin cannot be cured because ultraviolet rays are not transmitted through the total reflection film.

Japanese Patent Application Laid-Open No. 4-372741 shows a transparent quartz stamper, but the quartz must be prepared by an etching process in order to make the stamper which cannot be prepared in the usual production process of an optical disk. Therefore, a special facility is required.

Namely, according to the conventional production process of a two layered optical disk using the 2P resin, when the total reflection film is provided as the film on the molded substrate side, the 2P resin is sandwiched by the opaque total reflection film and the nickel stamper. Therefore, even if ultraviolet rays are used, they cannot reach the 2P resin. Accordingly, the conventional production process of an optical disk has a problem in that the 2P resin of the next generation optical disk with two layers on one side cannot be cured by ultraviolet rays.

Further, since a step of etching quartz or the like is necessary to form a stamper in the conventional production process of the optical disk, the stamper is not prepared in the usual production process of an optical disk, and a special facility with a high cost is required. Therefore, there is a problem in that the stamper cannot be easily produced and prepared in large quantities.

BRIEF SUMMARY OF THE INVENTION

An object of the present invention is to easily produce the next generation optical disk with two layers on one side by forming a transparent stamper by injection molding, which is the production process of an optical disk, preparing a semi-transparent stamper obtained by depositing a semi-transparent metal thin film on the transparent stamper, and using the semi-transparent stamper during curing of the 2P resin by ultraviolet rays.

Another object of the present invention is the production process of an optical disk, wherein when forming a layer of an ultraviolet curing resin, which constitutes a portion of the optical disk, a semi-transparent film of a metal is formed on a molded substrate upon which a pattern was transcribed, and this molded substrate is used as a semi-transparent stamper.

According to an object of the present invention, since the stamper is a semi-transparent stamper prepared from a resin, it transmits ultraviolet rays which the nickel stamper of a conventional apparatus does not transmit. Even if the total reflection film of a metal is formed on a molded substrate as the next generation optical disk, and ultraviolet rays cannot be irradiated from the substrate side, the ultraviolet rays are irradiated through the semi-transparent stamper and the 2P resin can be cured. Further, since the semi-transparent stamper can be prepared in one process of injection molding, which is the production process of an optical disk, disposable semi-transparent stampers can be easily produced in large quantities. Accordingly, it is advantageous from the viewpoint of cost, that a stamper in an optimum condition be utilized and the efficient production of an optical disk can be carried out.

Further, another object of the present invention is an optical disk having an ultraviolet curing resin layer, including at least a first substrate; a first metal thin film layer formed on the first substrate; and a layer of the ultraviolet curing resin formed on the first metal thin film layer and cured by irradiation of ultraviolet rays through a semi-transparent stamper having a semi-transparent metal film formed on a transparent molded substrate having a pattern transcribed thereon.

According to an embodiment of the present invention, the optical disk is a next generation optical disk with two layers on one side, but since the semi-transparent stamper, obtained by forming a semi-transparent metal film on a transparent molded substrate having a pattern transcribed thereon, is used, the 2P resin, which is an ultraviolet curing resin, which could not be used in conjunction with a conventional nickel stamper, can be used even if the optical disk has the structure of two layers on one side. Thus, an optical disk can be provided having high reliability while suppressing costs for a stamper.

DETAILED DESCRIPTION OF THE INVENTION

Figure 1:
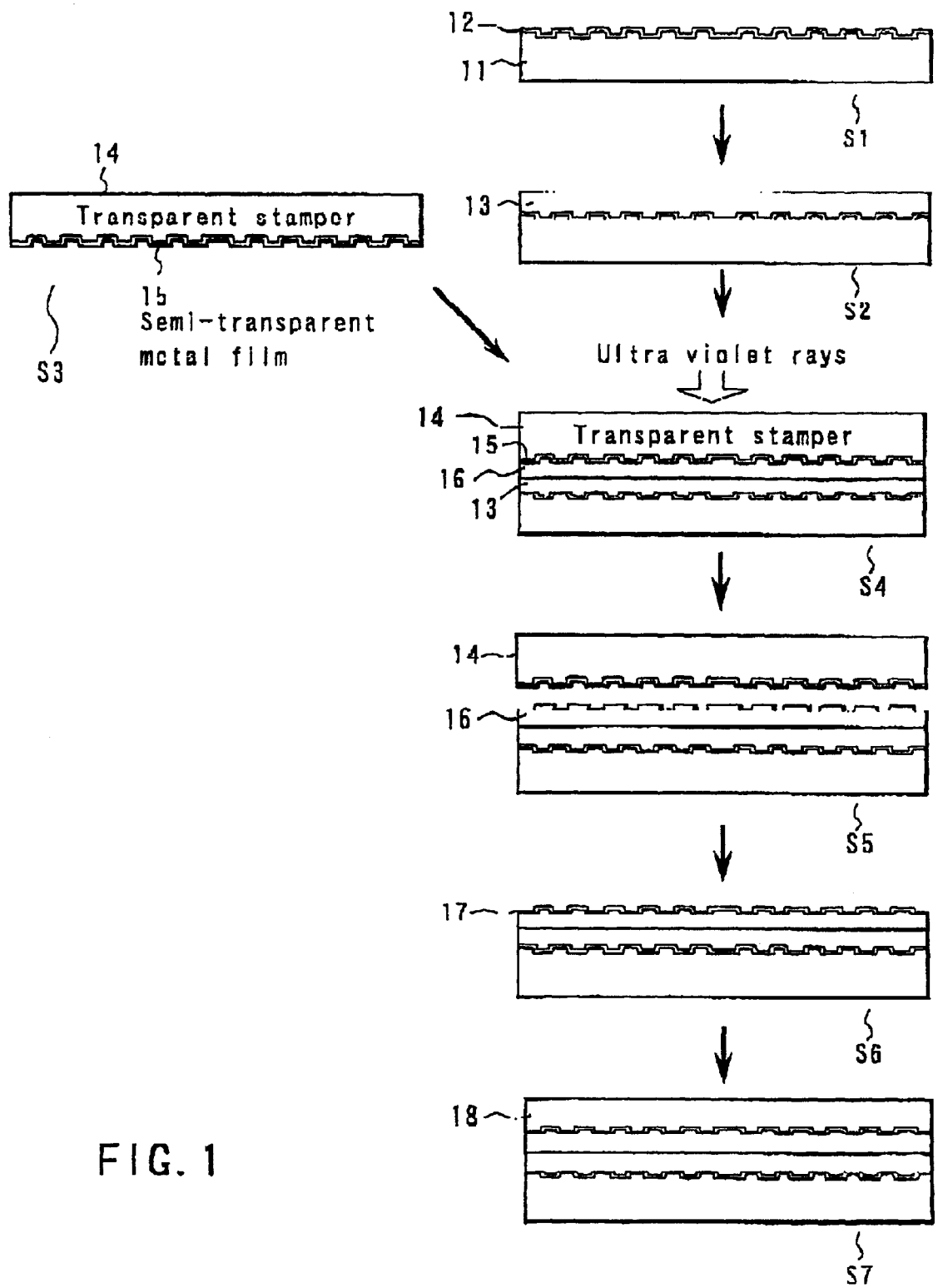
FIG. 1 is a view showing one mode of operation of the production process of an optical disk which is related to the present invention.
Figure 2A:
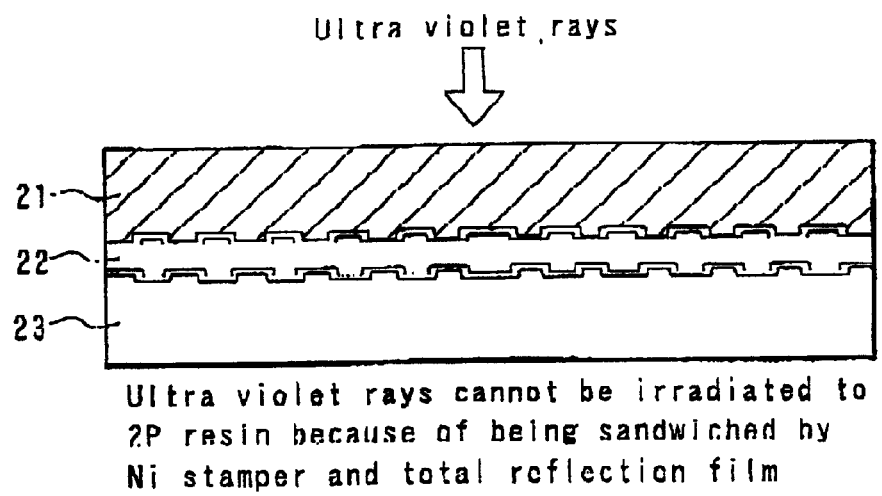
FIGS. 2A and 2B are views for illustrating the action aid effect of the production process of an optical disk which is related to the present invention.
Figure 2B:
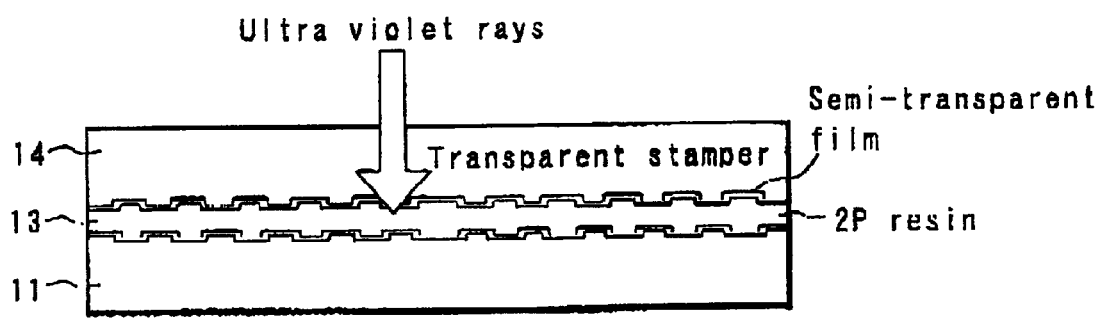
Figure 3:
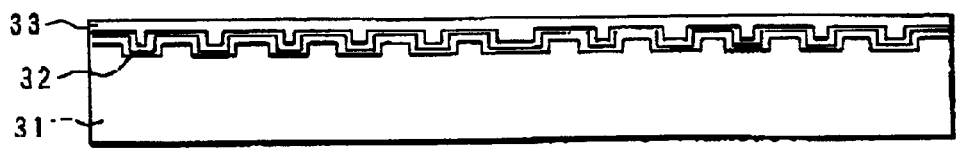
FIG. 3 is a view showing one mode of operation of the next generation optical disk according to the production process of an optical disk which is related to the present invention.
Figure 4:
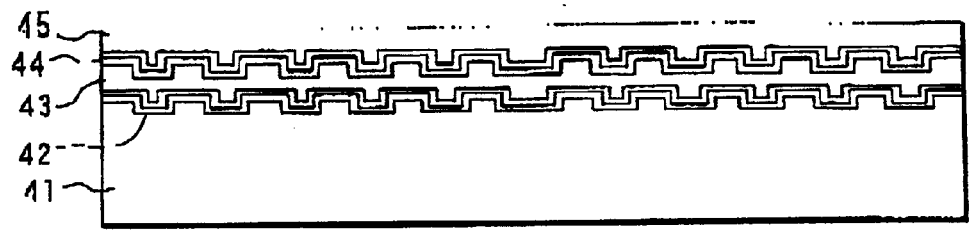
FIG. 4 is a view showing an example of the next generation optical disk according to the production process of an optical disk which is related to the present invention.

The production process of an optical disk which is the mode of operation of an embodiment of the present invention is explained in detail below referring to the drawings. FIG. 1 is a view showing one mode of operation of the production process of an optical disk which is related to the present invention; FIGS. 2A and 2B are views for illustrating the action and effect; and FIG. 3 and FIG. 4 are views showing an example of the next generation optical disk according to the production process of an optical disk which is related to the present invention.

The production process of a two-layered optical disk which is related to the present invention is illustrated according to FIG. 1. It is assumed in the illustrated mode of operation that it is a next generation optical disk with two layers on one side upon which laser light is incident from a cover layer 18 side. As shown in FIG. 3 and FIG. 4, the next generation optical disk is a disk to which laser light is irradiated from a cover layer side, and a reflection film 32 is formed on a molded substrate 31 in the optical disk of FIG. 3, and a cover layer 33 is further provided. The total reflection film 42 of Layer 1 is formed on a molded substrate 41 in the optical disk of FIG. 4, a semi-transparent film 44 of Layer 0 is further formed on an intermediate layer 43, and a cover layer 45 is further provided. The production process of an optical disk which is explained below makes an optical disk with two layers on one side which is shown in FIG. 4. In FIG. 1, the total reflection film 12 is formed on Layer 1, namely the first molded substrate 11, and a semi-transparent film 17 is formed on Layer 0, namely the 2P resin layer 16.

Firstly, the first molded substrate 11 which becomes Layer 1, is formed (S1). At this time, a polycarbonate, PMMA (poly methyl methacrylate), an amorphous polyolefin or the like are usually used as a material. The information pattern of Layer 1 is transcribed on the surface of the molded substrate 11. The pattern is transcribed via molding by mounting a nickel stamper on which a pattern was engraved, on a molding mold. Further, the total reflection film is formed on the pattern of the molded substrate by a spattering method or the like (S1). A recording film is further formed on it in the case of a rewritable disk.

The first intermediate layer 13 is formed on the Layer 1, which was formed by the above-mentioned manner (S2). The first intermediate layer 13 is a layer for enhancing adhesive force with the second intermediate layer 16 whose material is the 2P resin (Photo-Polymer) which is formed later. An ultraviolet curing type adhesive, a gluing agent, a pressure sensitive adhesive, a dry photo polymer sheet or the like are used as the material of the first intermediate layer 13. The second intermediate layer 16 (2P resin) is coated on the first intermediate layer 13, and a pattern is transcribed by being pushed with a stamper on which the information pattern of the layer 0 was engraved. Since the 2P resin has a weak adhesive force with a metal, the adhesive force can be enhanced by inserting the intermediate layer, which is an adhesive layer, between the 2P resin layer and Layer 1.

Hereat, a conventional technology utilizes a nickel stamper as a stamper. However, the next generation optical disk takes the mode of two layers on one side, therefore since the laser light is incident on a side (cover layer side) opposite the molded substrate, the total reflection film is provided on the first molded substrate as Layer 1. Accordingly, if Layer 0 is formed by the nickel stamper and the 2P resin, ultraviolet rays cannot irradiate the 2P resin because the 2P resin is sandwiched by the total reflection film and the nickel stamper, and the 2P resin cannot be cured. The aspect is shown by FIG. 2A, which illustrates that ultraviolet rays cannot be irradiated to the 2P resin from the nickel stamper side or the total reflection film side.

Accordingly, in the present invention, the molded substrate 14 is prepared as shown in FIG. 1. The semi-transparent film of a metal is formed on it by a spattering methodor the like, and it is used as the semi-transparent stamper (S3). FIG. 2B illustrates curing the 2P resin by ultraviolet rays. The information pattern of the layer 0 is engraved on the molded substrate 14, and a polycarbonate, PMMA, an amorphous polyolefin or the like are used as a material, and the molded substrate 14 is made by injection molding by the nickel stamper in a similar manner as the first molded substrate. Metals which do not adhere to the 2P resin such as, for example, aluminum, silver, gold or the like, are used as the semi-transparent film.

Then, the transparent stamper 14 is pushed onto the second adhesive layer (2P resin) 16, the 2P resin is cured by irradiating ultraviolet rays through the transparent stamper, and the pattern of the transparent stamper is transcribed on the 2P resin (S4). Then, the transparent stamper is peeled at the interface of the semi-transparent metal film 15 and the 2P resin 16 (S5). Further, the semi-transparent film 17 (the semi-transparent recording film in the case of a rewritable disk) is formed on the peeled 2P resin by a spattering method or the like to make Layer 0 (S6). Finally, the cover layer 18 is formed on Layer 0, and the optical disk with two layers on one side is completed (S7).

According to the above-mentioned production process, the problem can be avoided that the 2P resin is not cured because the nickel stamper does not transmit ultraviolet rays in the production of the next generation optical disk with two layers on one side. Furthermore, the semi-transparent stamper which is used here is composed of the molded substrate which can be formed by the usual production process of an optical disk and the semi-transparent metal film. Therefore, a special additional facility for preparing a stamper is also unnecessary, and the semi-transparent stamper can be easily produced in large quantities on the existing production line. Accordingly, it becomes possible to easily produce an optical disk with two layers on one side.

According to the above-mentioned various modes of operation, the present invention covers a broad range which is not inconsistent with the disclosed principle and new characteristics, and is not limited to the above-mentioned modes of operation.

According to the method of the optical disk using the semi-transparent stamper of the present invention, it is possible to use 2P resin by irradiating ultraviolet rays over and through the stamper, so that 2P resin can be used to manufacture the next generation optical disk with two layers on one side.

Further, the stamper is obtained by material and processes equivalent to a typical optical disk, can be easily produced in large quantities by the existing DVD production process without the necessity of an additional facility, and can be used as a cheap and disposable stamper.

What is claimed is:

1. A production process of an optical disk, comprising:

forming a first metal thin film on a first substrate;

forming a layer of an ultraviolet curing resin on the first metal thin film;

forming a transparent molded substrate having a pattern transcribed thereon by injection molding in a same manner as a production process of the first substrate;

forming a semi-transparent stamper by evaporating a semi-transparent film made of at least one metal selected from gold, silver, and aluminum onto the transparent molded substrate in a same manner as a production process of the first metal thin film; and curing the ultraviolet curing resin layer by irradiating ultraviolet rays through the semi-transparent stamper;

forming a second metal thin film on the ultraviolet curing rein layer which has been cured; and forming a cover layer on the second metal thin film.

2. A production process of an optical disk according to claim 1, wherein the semi-transparent stamper is comprised of a polycarbonate.

3. A production process of an optical disk according to claim 1, wherein the semi-transparent stamper is comprised of PMMA.

4. A production process of an optical disk according to claim 1, wherein the semi-transparent stamper is comprised of an amorphous polyolefin.

5. A production process of an optical disk according to claim 2, further comprising forming an intermediate layer for adhering the first metal thin film with the ultraviolet curing resin, on the first metal thin film after forming the first metal thin film on the first substrate.

6. A production process of an optical disk according to claim 5, wherein the intermediate layer is formed by an ultraviolet curing adhesive.

7. A production process of an optical disk according to claim 5, wherein the intermediate layer is formed by a gluing agent.

8. A production process of an optical disk according to claim 5, wherein the intermediate layer is formed by a pressure-sensitive adhesive.

9. A production process of an optical disk according to claim 5, wherein the intermediate layer is formed by a dry photo polymer sheet.

* * * * *